(12) United States Patent
King

(10) Patent No.: US 6,656,624 B1
(45) Date of Patent: Dec. 2, 2003

(54) POLARIZED GAS SEPARATOR AND LIQUID COALESCER FOR FUEL CELL STACK ASSEMBLIES

(75) Inventor: George R. King, The Woodlands, TX (US)

(73) Assignee: Reliant Energy Power Systems, Inc., Houston, TX (US)

( * ) Notice: Subject to any disclaimer, the term of this patent is extended or adjusted under 35 U.S.C. 154(b) by 140 days.

(21) Appl. No.: 09/740,423

(22) Filed: Dec. 19, 2000

Related U.S. Application Data

(63) Continuation-in-part of application No. 09/669,344, filed on Sep. 26, 2000, now Pat. No. 6,531,238.

(51) Int. Cl.[7] .......................... H01M 8/02; B32B 5/18; B32B 15/00
(52) U.S. Cl. .......................... 429/34; 96/296; 428/550; 428/599; 428/615; 428/307.3
(58) Field of Search .................. 429/34, 38, 39, 429/235; 96/11, 296; 428/307.3, 550, 566, 594, 615

(56) References Cited

U.S. PATENT DOCUMENTS

| | | | | |
|---|---|---|---|---|
| 2,008,800 A | * | 7/1935 | Somers | 96/296 X |
| 3,432,357 A | * | 3/1969 | Dankese | 429/34 |
| 3,615,862 A | | 10/1971 | Roth et al. | 136/120 FC |
| 3,616,841 A | | 11/1971 | Walz | 264/44 X |
| 3,617,385 A | * | 11/1971 | Gray | 429/39 |
| 3,772,086 A | | 11/1973 | Zeitner, Jr. et al. | 136/120 FC |
| 3,960,601 A | | 6/1976 | Schulz | 136/120 FC |
| 4,044,193 A | | 8/1977 | Petrow et al. | 429/40 |
| 4,058,482 A | | 11/1977 | Baris et al. | 252/425.3 |
| 4,125,676 A | | 11/1978 | Maricle et al. | 429/38 |
| 4,131,721 A | | 12/1978 | Fung et al. | 429/13 |
| 4,168,351 A | | 9/1979 | Taylor | 429/48 |

(List continued on next page.)

FOREIGN PATENT DOCUMENTS

| | | | | |
|---|---|---|---|---|
| DE | 19812155 A | 9/1999 | | H01M/8/06 |
| EP | 0 709 907 A1 | 5/1996 | | H01M/4/66 |
| JP | 05041239 | 6/1993 | | H01M/8/24 |
| JP | 63232275 | 9/1998 | | H01M/8/06 |
| WO | WO 95/06335 | 3/1995 | | H01M/8/06 |
| WO | WO 96/20509 A1 | 7/1996 | | H01M/8/24 |
| WO | WO 96/37005 | 11/1996 | | H01M/8/04 |
| WO | WO 97/24474 A1 | 7/1997 | | C25B/11/04 |
| WO | WO 00/72373 A1 | 11/2000 | | H01L/21/368 |
| WO | WO 01/20702 A2 | 3/2001 | | H01M/8/06 |
| WO | WO 01/25140 A1 | 4/2001 | | C01B/3/38 |

OTHER PUBLICATIONS

Dhar, Hari P., "On Solid Polymer Fuel Cells," Journal of Electroanalytical Chemistry, BCS Technology Inc., Bryan, TX., Oct. 1993.

(List continued on next page.)

*Primary Examiner*—Stephen Kalafut
(74) *Attorney, Agent, or Firm*—Baker Botts L.L.P.

(57) ABSTRACT

The present invention is a polarized gas separator useful in the bipolar construction of a fuel cell stack. It comprises a porous conductive substrate and a barrier layer, the barrier layer having a first side and a second side, and laterally extending through the porous conductive substrate so that a first portion of the porous conductive substrate extends from the first side of the barrier layer and a second portion of the porous conductive substrate extends from the second side of the barrier layer. Effectively, the polarized gas separator is a single component system that not only enhances power performance of fuel cell stacks but also defeats several problems previously unsolvable by conventional bipolar plate assemblies.

36 Claims, 6 Drawing Sheets

U.S. PATENT DOCUMENTS

| | | | | |
|---|---|---|---|---|
| 4,175,165 A | 11/1979 | Adlhart | | 429/30 |
| 4,192,907 A | 3/1980 | Jalan et al. | | 429/40 |
| 4,356,240 A | 10/1982 | Dey et al. | | 429/101 |
| 4,365,007 A | * 12/1982 | Maru et al. | | 429/34 X |
| 4,372,759 A | 2/1983 | Sederquist et al. | | 55/73 |
| 4,390,446 A | 6/1983 | Barnette et al. | | 252/182.1 |
| 4,396,480 A | 8/1983 | Hegedus et al. | | 429/33 |
| 4,413,041 A | 11/1983 | Hegedus | | 429/33 |
| 4,458,411 A | 7/1984 | Dey et al. | | 29/623.2 |
| 4,463,065 A | 7/1984 | Hegedus et al. | | 429/33 |
| 4,496,437 A | 1/1985 | McIntyre et al. | | 204/24 |
| 4,525,440 A | 6/1985 | Barnette et al. | | 429/191 |
| 4,529,677 A | 7/1985 | Bodendorf | | 429/252 |
| 4,556,613 A | 12/1985 | Taylor et al. | | 429/101 |
| H16 H | 1/1986 | Kaun | | 429/29 |
| 4,735,872 A | 4/1988 | Maimoni | | 429/27 |
| 4,769,297 A | 9/1988 | Reiser et al. | | 429/17 |
| 4,800,138 A | 1/1989 | Romanowski et al. | | 429/19 |
| 4,818,741 A | 4/1989 | Herscovici | | 502/101 |
| 4,876,115 A | 10/1989 | Raistrick | | 427/115 |
| RE33,149 E | 1/1990 | Petrow et al. | | 429/40 |
| 4,910,099 A | 3/1990 | Gottesfeld | | 429/13 |
| 4,910,106 A | 3/1990 | Kafchinski et al. | | 429/254 |
| 4,925,749 A | 5/1990 | Wright | | 429/104 |
| 4,973,358 A | 11/1990 | Jin et al. | | 75/415 |
| 4,973,532 A | 11/1990 | Taskier et al. | | 429/62 |
| 4,988,583 A | 1/1991 | Watkins et al. | | 429/30 |
| 5,008,163 A | 4/1991 | Smith et al. | | 429/40 |
| 5,013,618 A | 5/1991 | Luczak | | 429/44 |
| 5,068,161 A | 11/1991 | Keck et al. | | 429/44 |
| 5,071,717 A | 12/1991 | Bushnell | | 429/13 |
| 5,079,105 A | 1/1992 | Bossel | | 429/19 |
| 5,108,849 A | 4/1992 | Watkins et al. | | 429/30 |
| 5,110,692 A | * 5/1992 | Farooque et al. | | 429/38 X |
| 5,139,896 A | 8/1992 | Smith et al. | | 429/40 |
| 5,242,764 A | 9/1993 | Dhar | | 429/30 |
| 5,264,299 A | 11/1993 | Krasij et al. | | 429/30 |
| 5,316,747 A | 5/1994 | Pow et al. | | 423/247 |
| 5,318,863 A | 6/1994 | Dhar | | 429/30 |
| 5,344,724 A | 9/1994 | Ozaki et al. | | 429/94 |
| 5,360,679 A | 11/1994 | Buswell et al. | | 429/19 |
| 5,364,712 A | 11/1994 | Townsend | | 429/42 |
| 5,366,819 A | 11/1994 | Hartvigsen et al. | | 429/17 |
| 5,366,821 A | 11/1994 | Merritt et al. | | 429/21 |
| 5,418,079 A | 5/1995 | Diethelm | | 429/26 |
| 5,432,021 A | 7/1995 | Wilkinson et al. | | 429/17 |
| 5,434,020 A | 7/1995 | Cooper | | 429/210 |
| 5,441,819 A | 8/1995 | Voss et al. | | 429/13 |
| 5,441,821 A | 8/1995 | Merritt et al. | | 429/17 |
| 5,482,680 A | 1/1996 | Wilkinson et al. | | 422/177 |
| 5,482,792 A | 1/1996 | Faita et al. | | 429/30 |
| 5,503,944 A | 4/1996 | Meyer et al. | | 429/13 |
| 5,518,831 A | 5/1996 | Tou et al. | | 429/42 |
| 5,521,018 A | 5/1996 | Wilkinson et al. | | 42/26 |
| 5,527,363 A | 6/1996 | Wilkinson et al. | | 29/623.1 |
| 5,547,776 A | 8/1996 | Fletcher et al. | | 429/13 |
| 5,565,072 A | 10/1996 | Faita et al. | | 204/256 |
| 5,578,388 A | 11/1996 | Faita et al. | | 429/30 |
| 5,589,285 A | 12/1996 | Cable et al. | | 429/13 |
| 5,599,638 A | 2/1997 | Surampudi et al. | | 429/33 |
| 5,604,057 A | 2/1997 | Nazri | | 429/224 |
| 5,607,770 A | 3/1997 | Lewis et al. | | 428/408 |
| 5,624,769 A | 4/1997 | Li et al. | | 429/32 |
| 5,660,941 A | 8/1997 | Farooque et al. | | 429/19 |
| 5,674,644 A | 10/1997 | Nazri | | 429/224 |
| 5,683,828 A | 11/1997 | Spear et al. | | 429/13 |
| 5,707,755 A | 1/1998 | Grot | | 429/40 |
| 5,763,114 A | 6/1998 | Khandkar et al. | | 429/20 |
| 5,773,162 A | 6/1998 | Surampudi et al. | | 429/39 |
| 5,776,624 A | 7/1998 | Neutzler | | 429/26 |
| 5,776,625 A | 7/1998 | Kaufman et al. | | 429/30 |
| 5,827,495 A | 10/1998 | Tomimatsu et al. | | 423/600 |
| 5,848,351 A | * 12/1998 | Hoshino et al. | | 428/550 |
| 5,853,910 A | 12/1998 | Tomioka et al. | | 429/17 |
| 5,858,567 A | 1/1999 | Spear, Jr. et al. | | 429/12 |
| 5,863,671 A | 1/1999 | Spear, Jr. et al. | | 429/12 |
| 5,879,826 A | 3/1999 | Lehman et al. | | 429/13 |
| 6,007,932 A | 12/1999 | Steyn | | 429/31 |
| 6,017,650 A | 1/2000 | Ramunni et al. | | 429/42 |
| 6,020,083 A | 2/2000 | Breault et al. | | 429/36 |
| 6,022,634 A | 2/2000 | Ramunni et al. | | 429/34 |
| 6,033,804 A | 3/2000 | Doyle et al. | | 429/212 |
| 6,037,076 A | 3/2000 | Tomimatsu et al. | | 429/46 |
| 6,051,117 A | 4/2000 | Novak et al. | | 204/252 |
| 6,051,331 A | 4/2000 | Spear, Jr. et al. | | 429/34 |
| 6,074,692 A | 6/2000 | Hulett | | 427/115 |
| 6,096,448 A | 8/2000 | Wilkinson et al. | | 429/13 |
| 6,096,449 A | 8/2000 | Fuglevand et al. | | 429/13 |
| 6,096,450 A | 8/2000 | Walsh | | 429/34 |
| 6,099,984 A | 8/2000 | Rock | | 429/39 |
| 6,103,077 A | 8/2000 | DeMarinis et al. | | 204/290.07 |
| 6,106,964 A | 8/2000 | Voss et al. | | 429/20 |
| 6,110,333 A | 8/2000 | Spethmann et al. | | 204/252 |
| 6,124,053 A | 9/2000 | Bernard et al. | | 429/34 |
| 6,127,056 A | 10/2000 | Wheeler et al. | | 429/13 |
| 6,140,266 A | 10/2000 | Corrigan et al. | | 502/439 |
| 6,146,780 A | 11/2000 | Cisar et al. | | 429/34 |
| 6,146,781 A | 11/2000 | Surampudi et al. | | 429/35 |
| 6,150,056 A | * 11/2000 | Inagaki et al. | | 429/235 |
| 6,165,633 A | 12/2000 | Negishi | | 429/17 |
| 6,197,445 B1 | 3/2001 | Ward et al. | | 429/163 |
| 6,203,940 B1 | 3/2001 | Oltman et al. | | 429/122 |
| 6,207,308 B1 | 3/2001 | Grasso et al. | | 429/26 |
| 6,207,309 B1 | 3/2001 | Bonville et al. | | 429/26 |
| 6,210,820 B1 | 4/2001 | Knights et al. | | 429/13 |
| 6,210,826 B1 | 4/2001 | Dopp et al. | | 429/122 |
| 6,210,827 B1 | 4/2001 | Dopp et al. | | 429/122 |
| 6,218,035 B1 | 4/2001 | Fuglevand et al. | | 429/30 |
| 6,232,008 B1 | 5/2001 | Wozniczka et al. | | 429/39 |
| 6,232,010 B1 | 5/2001 | Cisar et al. | | 429/40 |
| 6,238,817 B1 | 5/2001 | Reiser | | 429/34 |
| 6,242,118 B1 | 6/2001 | Grasso et al. | | 429/13 |
| 6,248,462 B1 | 6/2001 | Bonville | | 429/24 |
| 6,265,093 B1 | 7/2001 | Surampudi et al. | | 429/13 |
| 6,268,076 B1 | 7/2001 | Diekmann et al. | | 429/30 |
| 6,277,508 B1 | 8/2001 | Reiser et al. | | 429/17 |
| 6,280,870 B1 | 8/2001 | Eisman et al. | | 429/34 |
| 6,284,399 B1 | 9/2001 | Oko et al. | | 429/19 |
| 6,303,244 B1 | 10/2001 | Surampudi et al. | | 429/17 |
| 6,316,134 B1 | 11/2001 | Cownden et al. | | 429/19 |
| 6,331,366 B1 | 12/2001 | Van Dine et al. | | 429/17 |
| 6,372,376 B1 | 4/2002 | Fronk et al. | | 429/41 |
| 6,387,556 B1 | 5/2002 | Fuglevand et al. | | 429/22 |
| 6,387,557 B1 | 5/2002 | Krasij et al. | | 429/32 |
| 6,399,234 B2 | 6/2002 | Bonk et al. | | 429/32 |
| 6,403,249 B1 | 6/2002 | Reid | | 429/39 |
| 6,410,180 B1 | 6/2002 | Cisar et al. | | 429/41 |
| 6,413,664 B1 | 7/2002 | Wilkinson et al. | | 429/34 |
| 2001/0031389 A1 | 10/2001 | Appleby et al. | | 429/40 |
| 2002/0068208 A1 | 6/2002 | Dristy et al. | | 429/34 |

OTHER PUBLICATIONS

Bernardi, Dawn M., "Water–Balance Calculations for Solid– Polymer–Electrolyte Fuel Cells," Journal of the Electrochemical Society, Physical Chemistry Department, General Motors Research Laboratories, Michigan, vol. 137, No. 11, Nov. 1990.

Hendel, Frank J., "Water Recovery From Fuel Cells and Lunar Minerals," I & EC, vol. 56, No. 3, Mar. 1964.

Journal of Power Sources, "Recent Advances in Solid Polymer Electrolyte Fuel Cell Technology with Low Platinum Loading Electrodes," vol. 29, pp. 367–387, Feb. 1990.

Journal of Power Sources, "Advances in Solid Polymer Electrolyte Fuel Cell Technology with Low Platinum Loading Electrodes," vol. 22, (month unknown 1988), pp. 359–375.

Journal of Power Sources, "The Renaissance of the Solid Polymer Fuel Cell," vol. 29, (Jan. 1990) pp. 239–250.

Journal of Power Sources, "Solid Polymer Fuel Cell Developments at Ballard," vol. 37, (month unknown 1992), pp. 181–188.

Proceedings of the Symposium on Fuel Cells, Industrial Electrolytic Division, New Jersey, vol. 89–14, Nov. 1989.

"Operation Characteristics of a Solid Polymer Fuel Cell," Royal Military College of Canada, Ontario, Canada, Date unknown.

"Stainless Steel Wire Mesh Flow–Fields for Polymer Electrolyte Fuel Cells," Electronic and Electrochemical Materials and Devices Research Group, New Mexico, Date unknown.

* cited by examiner

POLARIZED GAS SEPARATOR AND LIQUID COALESCER FOR FUEL CELL STACK ASSEMBLIES

RELATED REFERENCES

This application is a continuation-in-part of Application No. 09/669,344, filed Sep. 26, 2000, now U.S. Pat. No. 6,531,328.

BACKGROUND OF THE INVENTION

The present invention relates in general to the field of proton exchange membrane ("PEM") fuel cell stack assemblies, and more particularly, to an improved polarized gas separator for use in the bipolar construction of fuel cell stack assemblies.

A fuel cell is an electrochemical device that converts fuel and oxidant into electricity and a reaction by-product through an electrolytic reaction that strips hydrogen molecules of their electrons and protons. Ultimately, the stripped electrons are collected into some form of usable electric current, by resistance or by some other suitable means. The protons react with oxygen to form water as a reaction by-product.

Natural gas is the primary fuel used as the source of hydrogen for a fuel cell. If natural gas is used, however, it must be reformed prior to entering the fuel cell. Pure hydrogen may also be used, if stored correctly. The products of the electrochemical exchange in the fuel cell are DC electricity, liquid water, and heat. The overall PEM fuel cell reaction produces electrical energy equal to the sum of the -separate half-cell reactions occurring in the fuel cell, less its internal and parasitic losses. Parasitic losses are those losses of energy that are attributable to any energy required to facilitate the ternary reactions in the fuel cell.

Although fuel cells have been used in a few applications, engineering solutions to successfully adapt fuel cell technology for use in electric utility systems have been elusive. The challenge is for the generation of power in the range of 1 to 100 kW that is affordable, reliable, and requires little maintenance. Fuel cells would be desirable in this application because they convert fuel directly to electricity at much higher efficiencies than internal combustion engines, thereby extracting more power from the same amount of fuel. This need has not been satisfied, however, because of the prohibitive expense associated with such fuel cell systems. For example, the initial selling price of the 200 kW PEM fuel cell was about $3500/kW to about $4500/kW. For a fuel cell to be useful in utility applications, the life of the fuel cell stack must be a minimum of five years and operations must be reliable and maintenance-free. Heretofore known fuel cell assemblies have not shown sufficient reliability and have disadvantageous maintenance issues. Despite the expense, reliability, and maintenance problems associated with heretofore known fuel cell systems, because of their environmental friendliness and operating efficiency, there remains a clear and present need for economical and efficient fuel cell technology for use in residential and light commercial applications.

Fuel cells are usually classified according to the type of electrolyte used in the cell. There are four primary classes of fuel cells: (1) proton exchange membrane ("PEM") fuel cells, (2) phosphoric acid fuel cells, and (3) molten carbonate fuel cells. Another more recently developed type of fuel cell is a solid oxide fuel cell. PEM fuel cells, such as those in the present invention, are low-temperature, low-pressure systems, and are, therefore, wellsuited for residential and light commercial applications. PEM fuel cells are also advantageous in these applications because there is no corrosive liquid in the fuel cell and, consequently, there are minimal corrosion problems.

Characteristically, a single PEM fuel cell consists of three major components-an anode gas dispersion field ("anode"); a membrane electrode assembly ("MEA"); and a cathode gas and liquid dispersion field ("cathode"). As shown in FIG. 1, the anode typically comprises an anode gas dispersion layer 106 and an anode gas flow field 104; the cathode typically comprises a cathode gas and liquid dispersion layer 110 and a cathode gas and liquid flow field 112. In a single cell, the anode and the cathode are electrically coupled to provide a path for conducting electrons between the electrodes through an external load. MEA 108 facilitates the flow of electrons and protons produced in the anode, and substantially isolates the fuel stream on the anode side of the membrane from the oxidant stream on the cathode side of the membrane. The ultimate purpose of these base components, namely, the anode, the cathode, and MEA 108, is to maintain proper ternary phase distribution in the fuel cell. Ternary phase distribution as used herein refers to the three simultaneous reactants in the fuel cell, namely, hydrogen gas, water vapor, and air. Heretofore known PEM fuel cells, however, have not been able to efficiently maintain proper ternary phase distribution. Catalytic active layers 100 and 102 are located between the anode, the cathode, and the electrolyte. The catalytic active layers 100 and 102 induce the desired electrochemical reactions in the fuel cell. Specifically, catalytic active layer 100, the anode catalytic active layer, rejects the electrons produced in the anode in the form of electric current. The oxidant from the air that moves through the cathode is reduced at the catalytic active layer 102, referred to as the cathode catalytic active layer, so that it can oxidate the protons flowing from anode catalytic active layer 100 to form water as the reaction by-product. The protons produced by the anode are transported by the anode catalytic active layer 100 to the cathode through the electrolyte polymeric membrane.

The anode gas flow field and cathode gas and liquid flow field are typically comprised of pressed, polished carbon sheets machined with serpentine grooves or channels to provide a means of access for the fuel and oxidant streams to the anode and cathode catalytic active layers. The costs of manufacturing these plates and the associated materials costs are very expensive and have placed constraints on the use of fuel cells in residential and light commercial applications. Further, the use of these planar serpentine arrangements to facilitate the flow of the fuel and oxidant through the anode and cathode has presented additional operational drawbacks in that they unduly limit mass transport through the electrodes, and therefore, limit the maximum power achievable by the fuel cell.

One of the most problematic drawbacks of the planar serpentine arrangement in the anode and cathode relates to efficiency. In conventional electrodes, the reactants move through the serpentine pattern of the electrodes and are activated at the respective catalytic layers located at the interface of the electrode and the electrolyte. The actual chemical reaction that occurs at the anode catalytic active layer is: $H_2 \leftrightharpoons 2H^{3O} + 2e^-$. The chemical reaction at the cathode catalytic active layer is: $2H^+ + 2e^- + \frac{1}{2}O_2 \leftrightharpoons H_2O$. The overall reaction is: $H_2 + \frac{1}{2}O_2 \; H_2O$. The anode disburses the anode gas onto the surface of the catalytic active layer, which is comprised of a platinum catalyst electrolyte, and the cathode disburses the cathode gas onto the surface of the cathode catalytic active layer of the electrolyte. However, when utilizing a conventional serpentine construction, the anode gas and the cathode gas are not uniformly disbursed onto these layers. Nonuniform distribution of the anode and cathode gas at the membrane surfaces results in an imbalance in the water content of the electrolyte. This results in a significant decrease in efficiency in the fuel cell.

The second most problematic drawback associated with serpentine arrangements in the electrodes relates to the ternary reactions that take place in the fuel cell itself. Serpentine arrangements provide no pressure differential within the electrodes. This prohibits the necessary ternary reactions from taking place simultaneously. This is particularly problematic in the cathode as both a liquid and a gas are transported simultaneously through the electrode'ss serpentine pattern.

Another shortcoming of the conventional serpentine arrangement in the anode in particular is that the hydrogen molecules resist the inevitable flow changes in the serpentine channels, causing a build-up of molecular density in the turns in the serpentine pattern, resulting in temperature increases at the reversal points. These hot spots in the serpentine arrangement unduly and prematurely degrade the anode catalytic active layer and supporting membrane.

In the typical PEM fuel cell assembly, a PEM fuel cell is housed within a frame that supplies the necessary fuel and oxidant to the flow fields of the fuel cell. These conventional frames typically comprise manifolds and channels that facilitate the flow of the reactants. However, usually the channels are not an integral part of the manifolds, which results in a pressure differential along the successive channels. FIG. 2 is an illustration of a conventional frame for the communication of the reactants to a fuel cell. This pressure differential causes the reactants, especially the fuel, to be fed into the flow fields unevenly, which results in distortions in the flow fields, ultimately causing hot spots. This also results in nonuniform disbursement of the reactants onto the catalytic active layers. Ultimately, this conventional method of supplying the necessary fuel and oxidant to a fuel cell results in a very inefficient process.

As a single Proton Exchange Membrane ("PEM") fuel cell produces only about 0.30 to 0.90 volts D.C. under a load, the key to developing useful PEM fuel cell technology is being able to scale-up current density in individual PEM fuel cell assemblies to produce sufficient current for larger applications without sacrificing fuel cell efficiency. To accomplish this, practical PEM fuel cell plants have been built from multiple fuel cell assemblies stacked together. Practical stacks generally consist of 20 or more cells in order to produce the direct current voltages necessary for efficient inverting to alternating current. To form stack assemblies, individual fuel cell assemblies are electrically connected to form "nodes," which are then electrically connected to form "fuel cell stacks" or "fuel cell stack assemblies." Nodes may be connected in series or parallel to efficiently increase overall power output. When connecting these nodes, to reduce the number of parts and to minimize costs, bipolar separator plates are used between adjacent individual cells. More specifically, in these bipolar plates, one side of the plate serves as the anode side and services the anode side of one fuel cell assembly; and the other side of the plate serves as the cathode side and services the cathode side of another fuel cell assembly. This is often described as bipolar construction. A barrier to free water and gas flow between the two sides of the bipolar plate exists to keep the hydrogen gas flow and the oxygen gas flow separate from one another. A bipolar plate also collects electrons liberated at one electrode, conducts the electrons through the barrier plate, and delivers the electrons to the face of the other electrode on the opposing side of the barrier.

Conventional bipolar plates used in the bipolar construction of fuel cell stacks generally contain three elements: a first gas flow field, an internal barrier or separator plate, and a second gas flow field, specifically a gas and liquid flow field (both referred to in the following generically as flow fields). In conventional assemblies, the flow fields are made from sheets constructed from metals, such as titanium, nickel, and stainless steel, or nonmetallic conductors, such as graphitic carbon. These sheets typically have a series of channels or grooves machined into their surfaces that allow for the passage of gases and liquids such as those described above. These channels or grooves are usually arranged in a serpentine-like pattern, and thus, are subject to the difficulties and problems described above.

The internal barriers or separator plates of conventional assemblies are often fabricated from graphite or metal, such as stainless steel, titanium, or nickel as well. In conventional designs, the internal barrier or separator plate and the gas flow fields are mechanically bonded together. The bonding mechanism has historically been sintering.

Whenever the gas flow fields are bonded to the internal barrier or separator plate by mechanical means, the electrical resistance in the bipolar plate increases, which leads to efficiency losses in the fuel cell stack assembly. Typically, the resistance in such bipolar plates is at best 3.4 ohms. This is undesirable, as excessive resistance diminishes the power potential of the fuel cell stack. The mechanical bonding may also be problematic if not completely accurate because air gaps may be created between the flow fields and the internal barrier. Another problem with conventional bipolar plates is that the mechanical bonding process can introduce contaminants, which are primarily oxidants, into these metallurgical bonds between the flow fields and the internal barrier, which thereby contaminate the system and cause efficiency losses. This is also undesirable.

Additionally, conventional PEM fuel stacks often have poor water management in the cathode, which leads to flooded conditions in the cathode flow field. Flooding occurs when the free water (that is produced as a by-product of the electrochemical reaction) is not removed efficiently from the system. Flooding is particularly problematic because it impairs the ability of the oxygen reactant to adequately diffuse to the cathode catalytic active layer. This significantly increases the internal resistance of the cathode, which ultimately limits the cell voltage potential.

Heretofore known bipolar plates have also failed to manage the liquid-phase water that develops in the anode. As a by product of humidification conventional bipolar plate manufacturers have never recognized the presence of a liquid water management problem in the anode, conventional wisdom holds that water is in vapor form only on the anode side. In the development of the present invention, however, it has been discovered that in low pressure and low temperature PEM fuel cell systems, liquid-phase water exists in its liquid form on the anode side in addition to the free water produced as a by-product of the electrochemical exchange on the cathode side. This liquid-phase water in the anode creates problems in diffusion on the anode side that have yet to be recognized or addressed in conventional systems. These problems are detrimental to performance. To optimize fuel cell stack performance, liquid water management must be addressed on the anode side as well as on the cathode side. Conventional systems have not done this, and this lack of proper water management has led to an inherent loss in fuel cell stack assembly performance potential.

Conventional bipolar plate assemblies have additional problems in that they are difficult to manufacture. Further, strict quality control is required to ensure that the barrier between the two flow fields adequately seals one reactant from the other. These two factors make mass production an impossibility for conventional bipolar assemblies. Also, since conventional bipolar plate designs include three individual components, these conventional designs have problems related to internal electrical continuity and connectivity among the three parts. Adequate continuity and connectivity are difficult to achieve because the mechanical connections among the three individual components not only introduce additional electrical resistance to the system, but also require extreme precision in manufacturing.

Accordingly, there is a need for a bipolar flow field assembly that is suitable for use in bipolar construction of a fuel cell stack assembly, that introduces minimal resistance to the system, that separates the reactant gases completely, that effectively manages heat and produced water on both sides of the bipolar assembly itself, and that can be mass produced efficiently and economically.

SUMMARY OF THE INVENTION

Accordingly, the present invention provides a polarized gas separator comprising a flow field that may function as a bipolar flow field mechanism useful in the bipolar construction of a fuel stack assembly that is not only easy to manufacture in a mass production operation, but also reduces resistance, increases cell power potential, effectively manages heat and water within the separator itself, and facilitates a more effective distribution of the reactants to their respective catalytic active layers. It is greatly improved over conventional bipolar plate assemblies commonly used in bipolar construction, as it is a single component system having improved electrical connectivity and conductivity.

Most broadly, the present invention comprises a polarized gas separator comprising a porous conductive substrate and a barrier layer, the barrier layer having a first side and a second side, and laterally extending through the porous conductive substrate so that a first portion of the porous conductive substrate extends from the first side of the barrier layer and a second portion of the porous conductive substrate extends from the second side of the barrier layer. Thus, instead of having three individual components mechanically connected, the present invention provides a single component laterally bisected to effectively create a three-component system without disturbing the electrical properties of the single component. The polarized gas separator of the present invention is greatly improved over conventional bipolar plate assemblies as it is a single-component system rather than a composition of three components. Thus, instead of having two flow fields independently connected to an internal barrier component, the present invention provides one layer of material in a configuration that allows it to function as both an anode flow field and a cathode flow field, but the component itself is unbroken. Because the polarized gas separator of the present invention is a single component, it avoids the resistance problems encountered in manufacturing conventional assemblies. In fact, it is now possible to achieve $1.5 \times 10^{31\ 4}$ ohms of resistance or less within the separator. This is a great improvement over conventional bipolar plate assemblies, which have an internal resistance of at least 3.4 ohms. This single component system also increases connectivity and conductivity within the separator itself. Furthermore, the separator of the present invention is able to effectively seal the reactant gases from each other. Because it is a single component, its manufacture is suitable for mass production operations that are both efficient and effective. Residential applications for fuel cell stack assemblies utilizing the polarized gas separator for the present invention are, therefore, a reality. Specifically, the polarized gas separator of the present invention may be used in conjunction with the distribution frame and fuel cell stack assemblies described in Application Ser. No. 09/669,344, filed Sep. 26, 2000, now U.S. Pat. No. 6,531,238.

The different embodiments of the polarized gas separator of the present invention illustrate that a variety of materials may be used in a variety of selected configurations for the flow fields to achieve the beneficial effects of the present invention, including materials that are commonplace, and therefore, much less expensive than construction materials for conventional bipolar plate assemblies. Suitable materials for the porous conductive substrate include, but are not limited to: metal wool; wire mesh; three-dimensional open-cell foamed structures; carbon filaments; other conductive metal substrates; and aerated nickel wool. Suitable construction materials for the materials include: hastelloys, inconel, nickel, conductive plastics, metal composites, metal and plastic composites, plastic composites, tin oxides, stainless steel, and their derivatives. Essentially, any material that has sufficient porosity and surface texture is suitable in the present invention. A typical construction material for the barrier layer is a thermal-setting epoxy. The flexibility of the design of this polarized gas separator enhances the desirability of the present invention, especially as the push for affordable fuel cell operations for residential use increases.

As a result of the many improvements of the polarized gas separator of the present invention over conventional bipolar plate assemblies for the bipolar construction of fuel cell stack assemblies, significant improvements in power density, efficiency, and life of the fuel cell are provided at the individual cell, the node, and especially the stack level. Other advantages of the present invention will be apparent to those ordinarily skilled in the art in view of the following specification claims and drawings.

BRIEF DESCRIPTION OF THE DRAWINGS

A more complete understanding of the embodiments of the present invention and advantages thereof may be acquired by referring to the following description taken in conjunction with the accompanying drawings, in which like numbers indicate like features, and wherein.

DETAILED DESCRIPTION OF THE INVENTION

Figure 3:
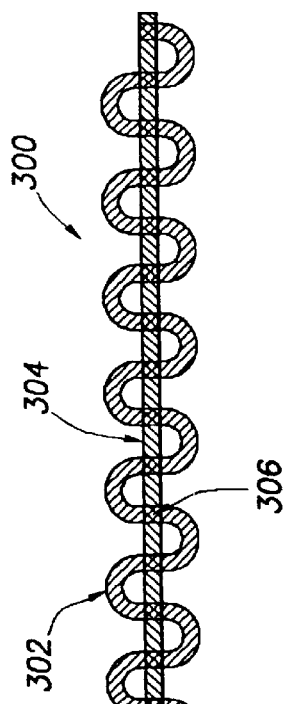
FIG. 3 is an edge-on view of an embodiment of the polarized gas separator of the present invention wherein the porous conductive substrate is corrugated.
Figure 4:
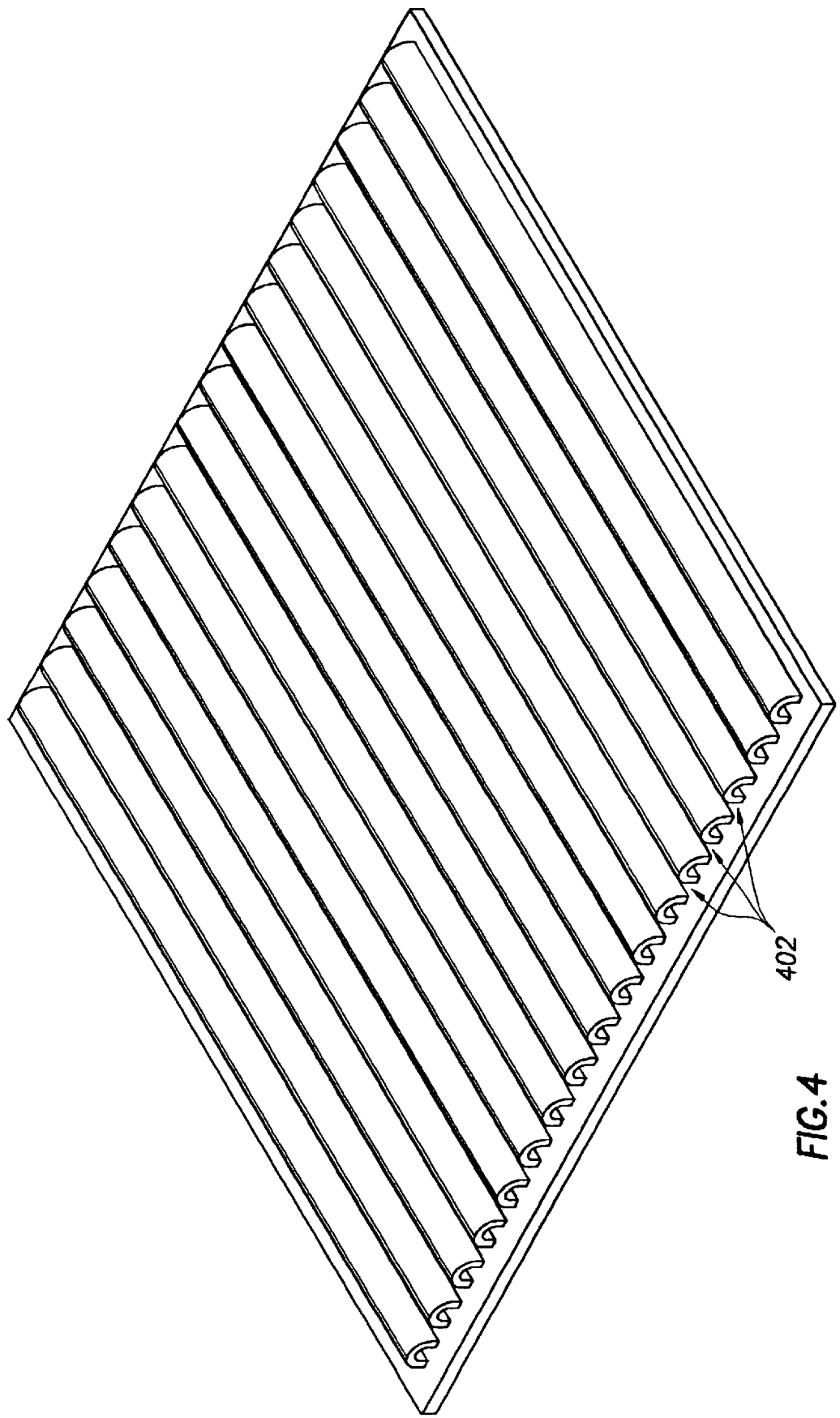
FIG. 4 is a top view of an embodiment of the polarized gas separator of the present invention wherein the porous conductive substrate is corrugated.

Shown generally at 300 in FIG. 3 is an edge-on view of one embodiment of the polarized gas separator of the present invention. Shown in FIG. 3 are the primary components of the polarized gas separator, porous conductive substrate 302, and barrier layer 304. Porous conductive substrate 302 is essentially a flow field that, in this particular embodiment, has rounded corrugations created by peaks and troughs in the flow field. A corrugated porous conductive substrate is one configuration of the porous conductive substrate that enables the polarized gas separator to be suitable for bipolar construction of a fuel cell stack assembly. The rounded corrugations have a pitch and a run that are defined by the peaks and the troughs of the corrugations. These corrugations create microchannels (as described in Pat. No. 6,531,238) that facilitate the removal of water and excessive heat from the fuel cell stack assembly. FIG. 4 illustrates these microchannels at 402. If used in conjunction with the distribution frame described in Pat. No. 6,531,238 and shown generally at 500 in FIG. 5, these microchannels run parallel to the air inlet 502 and the air and water outlet and perpendicular to fuel inlets 504. Because the microchannels run parallel to the air and water outlet, the microchannels can effectively remove the water from the anode side flow field and the cathode side flow field out air and water outlet 506. This corrugated configuration for the porous conductive substrate provides for effective management of the liquid-phase water in the anode side, previously unaddressed by conventional bipolar plate assemblies. It also provides for effective water management in the cathode side flow field.

As shown in FIG. 3, barrier layer 304 laterally spans porous conductive substrate 302 and effectively bisects it so that a portion of porous conductive substrate 302 extends from the top side of barrier layer 304 and a second portion of porous conductive substrate 302 extends from the bottom side of barrier layer 304. The bisected portions of the porous conductive substrate extending from the barrier layer may or may not be equal in size. Preferably, however, the bisected portions should be approximately equal in size, or one side may be approximately half the size of the other side if the smaller side is used as the anode side. Where the porous conductive substrate and the barrier layer intersect (represented as intersection 306), the barrier layer material effectively and completely fills the porous holes of porous conductive substrate 302 to prevent the passage of the gas reactants through the barrier layer but does not destroy the integrity of porous conductive substrate 302. Continuous electrical conductivity is maintained through porous conductive substrate 302 on both sides of barrier layer 304 despite the presence of barrier layer 304 because the electrical conductivity of the porous conductive substrate is not interrupted by barrier layer 304. In essence, the holes in the porous conductive substrate at the intersections between the porous conductive substrate and the barrier layer are full of the barrier material, and therefore, the reactant gases cannot pass through the barrier; but the electrical connections between the anode side and the cathode side of the porous conductive substrate are continuous because there is no interruption in the flow field despite the presence of barrier layer 304. Gases cannot penetrate barrier layer 304, and therefore, the reactant gases are effectively sealed from one another; however, because of the porosity and surface texture of porous conductive substrate 302, the reactant gases can move relatively freely within the two flow fields themselves that are formed by barrier layer 304, and are able to diffuse to the respective catalytic active layers of the membrane electrode assembly ("MEA") effectively. Moreover, barrier layer 304 may act as an insulator, and depending on the particular construction material used for barrier layer 304, the barrier layer may in fact enhance the electrical continuity of the porous conductive substrate because it has no electrical properties of its own that detract from the electrical continuity within the flow field.

As is evident from the description of FIG. 3, the structure of the polarized gas separator of the present invention requires no mechanical bonding mechanism, and therefore, electrical continuity is enhanced because resistance is not introduced via a bonding mechanism. Further, there are no air gaps in the connections between the flow fields and the barrier, as is often the case in conventional bipolar assemblies that would ordinarily create added resistance. A substantial reduction in disruptive electrical resistance is achieved as a result of this design.

Barrier layer 304 can be comprised of any thermal setting nonconductive thermoplastic that has sufficient insulating properties. Preferably, barrier layer 304 is a thermal setting epoxy or an epoxy derivative. Epoxy is preferred because of its good insulating properties and because of its suitable lack of electrical properties. To be most effective, the materials used as or to form barrier layer 304 should have no porosity and, preferably, should be completely dense. Most preferably, barrier layer 304 should be a monolithic layer. It is contemplated within the present invention that barrier layer 304 may be formed by a hardened formerly fluid composition such as a thermosetting thermoplastic; it is also contemplated that barrier layer 304 may be formed by a material that is able to completely seal the two portions of the flow field when used in its original form as long as it is able to bisect the porous conductive substrate, seal the reactant gases from each other effectively, and fill the holes in the porous conductive substrate at the intersections between the substrate and the barrier layer without disturbing the electrical properties of the porous conductive substrate. The preferable thickness of barrier layer 304 is about ¼ of the height or pitch of porous conductive substrate 302. Although it is contemplated that this thickness may vary, one must be conscious of the potential for voids in the barrier layer if it is made too thin. Also, thicker barriers may lead to a loss in area in the flow field—a loss in area in a flow field could possibly lead to problems in distributing the reactants to their designated catalytic active layers.

Figure 6:
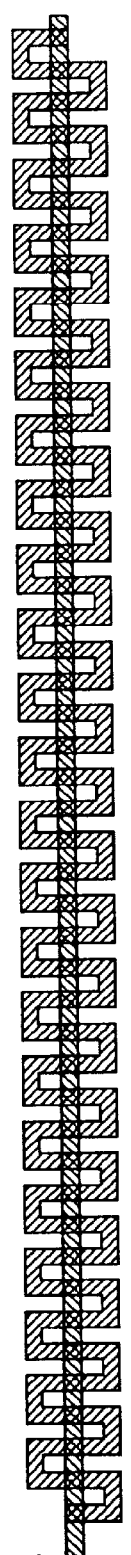
FIG. 6 is an edge-on view of an embodiment of the polarized gas separator of the present invention wherein the porous conductive substrate is continuously-folded.
Figure 8:
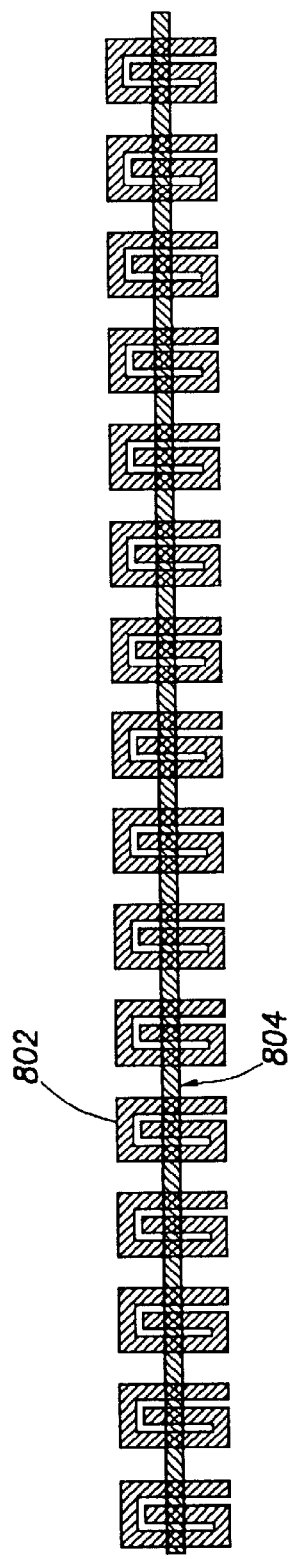
FIG. 8 is an edge-on view of an embodiment of the polarized gas separator of the present invention wherein the porous conductive substrate is discontinuously-folded.

Porous conductive substrate 302 can be made from a variety of different materials that may be, in turn, comprised of a variety of construction materials that may take on a variety of different configurations as illustrated in FIGS. 3, 6, and 8. First, the materials that can be used as the porous conductive substrate include, but are not limited to: metal wool; wire mesh; three-dimensional open-cell foamed structures suitable for gas diffusion (as described in Pat. No. 6,531,238, the disclosure of which is hereby incorporated by reference); and aerated nickel wool. The two main criteria that are useful in choosing which particular material is suitable for porous conductive substrate 302 are: (1) sufficient porosity, and (2) adequate surface textures. A three-dimensional open-cell foamed structure as described in Pat. No. 6,531,238 may be particularly suitable as porous conductive substrate 302 as this material has sufficient porosity and surface texture, and is well-suited to gas diffusion. As described in Pat. No. 6,531,238, these three-dimensional open-cell foams may be produced by electroplating nickel over a particulate plastic structure so that the voids created by the tangential intersections in the particulate plastic structure are filled with nickel. Although polystyrene may be used in this method, other materials, such as other particulate thermoplastic materials, would be suitable. Isinglass is one example. Once the nickel has cooled, the polystyrene particulate matter may be blown out of the formed foam with hot carbon dioxide gas or air to leave a three-dimensional nickel open-cell foamed flow field having substantially five-sided, geometrically-shaped orifices. In forming a corrugated porous conductive substrate, it is recommended that the pitch of the corrugations be equal to about five to six times the thickness of the material that forms the substrate, and the run of the corrugations be equal to about two to three times the thickness of the material. The number of peaks and troughs is dictated by the total length of the flow field based on these parameters. Of course, these specifications may be varied if suitable for the intended use. The advantage obtained from utilizing a three-dimensional open-cell foamed flow field in the present invention is that mass transfer within the resultant flow fields is enhanced. This is because the mass transfer rate is supplemented by the foamed flow field itself and its wicking ability, which allows the molecules to electromosatically move through the flow field. Another advantage associated with the foamed flow fields over conventional serpentine arrangements is that they facilitate the deposit of the reactants uniformly along the surfaces of the catalytic active layers.

Although the use of three-dimensional open-cell foamed structures as the porous conductive substrate in the present invention presents many advantages, these same advantages can be achieved with the use of metal wools or wire mesh provided that their surface texture and porosity are suitable. The surface texture of these materials may be sufficient without enhancement, but enhancement is possible with gold plating through an autocatalytic reaction as described in Pat. No. 6,531,238, the disclosure of which is incorporated herein by reference. Gold plating enhances mass transfer by increasing the surface area of the flow fields by as much as a factor of nine. Another advantage of gold plating the porous conductive substrate is that the leaflet potential of the gold preserves the structure of the substrate and protects it from electrolysis.

Suitable construction materials for the above materials possess good electrical conductivity properties, are conducive to flow distribution and include, but are not limited to: hastelloys, inconel, nickel, copper, conductive plastics, metal composites, plastic composites, tin oxides, gold, epitaxial substrates, stainless steel, and their derivatives. Iridium may also be used if it has sufficient electrical properties. Stainless steel 416, however, does not appear to be suitable at this time because of the potential for staining; staining is undesirable. If, for example, a plating technique or some other technique were developed that combated the potential for stainless steel 416 to stain, then it would be a suitable construction material. Other construction materials may be suitable as well. Another specific example of a suitable material of construction is a plastic material having sufficient porosity wherein carbon fibers have been imbedded so that it also has sufficient electrical properties.

These materials, namely three-dimensional, open-cell foams, metal wools, and wire mesh, can be used in a variety of configurations to form the porous conductive substrate. Suitable configurations for the porous conductive substrate include but are not limited to: corrugated (as shown in FIG. 3), continuously-folded (as shown in FIG. 6), and discontinuously-folded (as shown in FIG. 8). Although these three seem especially suitable configurations for the porous conductive substrate of the polarized gas separator, other configurations that may or may not be variations of these, are also contemplated within the present invention.

Figure 7:
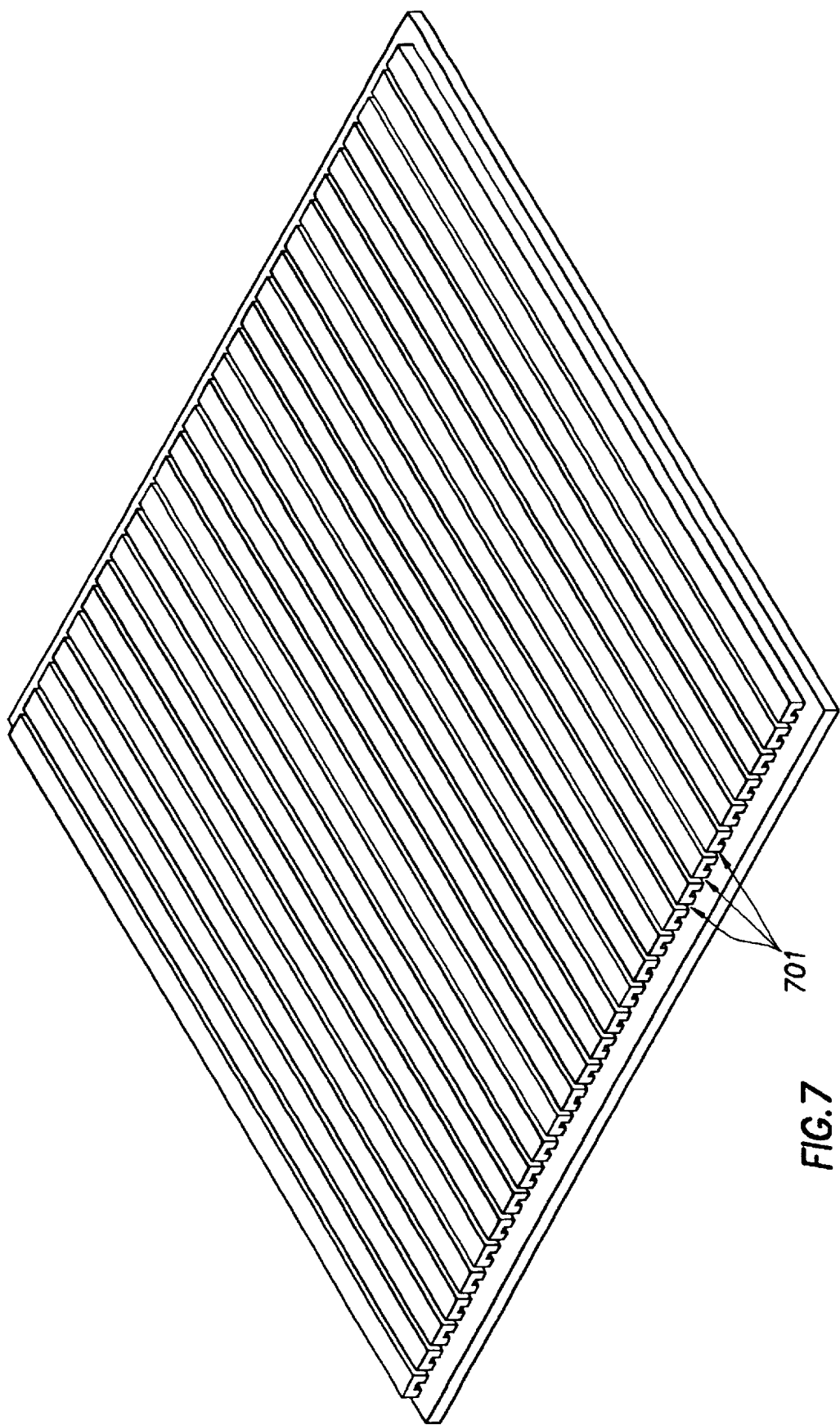
FIG. 7 is a top view of an embodiment of the polarized gas separator of the present invention wherein the porous conductive substrate is continuously-folded.

FIG. 6 depicts an edge-on view of an alternative embodiment of the polarized gas separator having a corrugated porous conductive substrate of the present invention wherein the porous conductive substrate is a continuously-folded porous conductive substrate. The continuously-folded porous conductive substrate embodiment of the present invention may be an improvement over the corrugated embodiment having rounded peaks in some instances as a result of the substantially flat top surfaces and bottom surfaces of the resultant corrugations or folds that provide a larger contact area with the contiguous layers of the fuel cell assembly. Essentially, the continuously-folded embodiment is another version of a corrugated flow field wherein the peaks created by the peaks and troughs are square rather than rounded. The peaks and troughs in the continuously-folded substrate have a pitch and a run that are defined by the substantially flat top surfaces, the substantially flat bottom surfaces, and the substantially vertical portions of the corrugations in the continuously-folded substrate. The vertical portion of the folds should be substantially perpendicular and connected to the top and bottom surfaces. Preferably (and similar to the guidelines for the corrugated embodiment), the pitch is equal to about five to six times the thickness of the material used to form the porous conductive substrate. The run, which is the length of the horizontal top or bottom surface of an individual fold, is equal to about two to three times the thickness of the material used to form porous conductive metal substrate 12. These specifications can be varied, however, depending on the particular diffusion rate needed and the desired width of the microchannels created between the peaks. The number of folds needed is dictated by the total length of the flow field based on these criteria. The folds also create microchannels in the flow fields that facilitate the removal of water and heat from the fuel cell assembly as shown in FIG. 7 at 701. The same materials and construction materials discussed above with respect to the corrugated embodiment may also be used in conjunction with the continuously-folded embodiment.

Figure 9:
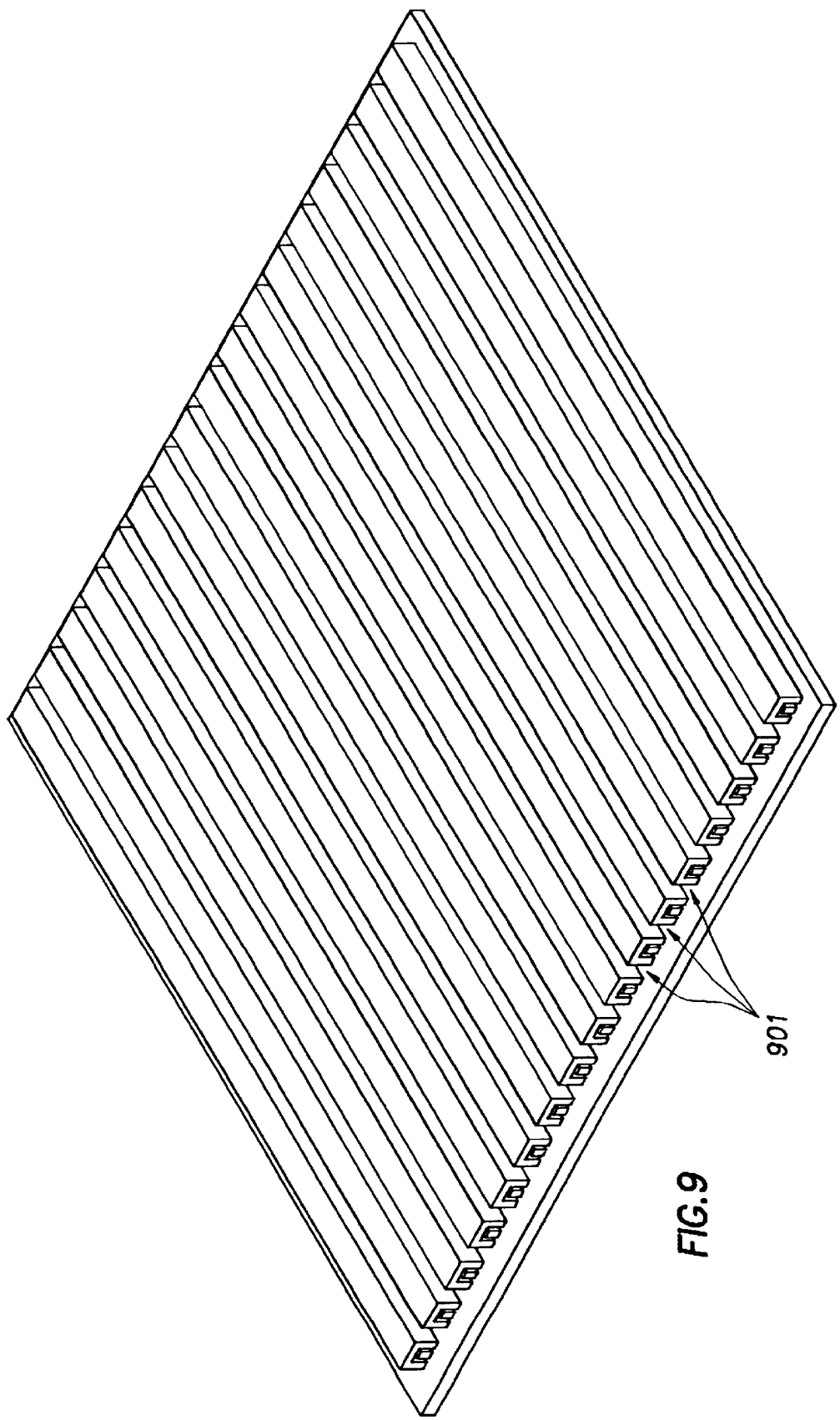
FIG. 9 is a top view of an embodiment of the present invention wherein the porous conductive substrate is discontinuously-folded.

FIG. 8 depicts another alternative embodiment of the polarized gas separator of the present invention wherein a discontinuously-folded porous conductive substrate is used. The discontinuously-folded configuration is made up of independent pods 802 formed from a chosen material that is porous and conductive. The same materials and construction materials discussed above for the corrugated embodiment may also be used in this embodiment. Additionally, each pod can be constructed from the same or a different material, and the same or a different construction material. Preferably, the pods are concentrically folded and arranged along a horizontal axis defined by barrier layer 804. The pods have a pitch and a run that are defined by the length of the horizontal top and bottom surfaces of each pod and the height of that pod. Preferably, the pitch is equal to about five to six times the thickness of the material used to form the individual pod, and the run is equal to about two to three times the thickness of the material used to form the pod. The spacing between the independent pods can vary from no spacing between the pods to as much as desired. Preferably, however, the spacing between the pods ranges from 2 to 6 times the thickness of one of the construction materials used to form one of the pods. This spacing can be guided by the desired width of the resultant microchannels created in the flow field as shown in FIG. 9 at 901. Of course, these specifications may be varied to optimize the system for an intended use. For example, one pod can be formed from a wire mesh made from nickel while another pod is formed from a stainless steel wool. The number of pods needed is dictated by the length of the flow field and the above criteria. If the pods are concentrically folded, they should include an outside layer and at least one internal layer formed from concentrically folding the porous conductive substrate. More folds may be appropriate in a given application, however. The empty space created between the layers by the concentric folds is preferably twice the thickness of the substrate used for the pod. Microchannels are created in the flow fields between the individual pods that facilitate the removal of heat and water from the fuel cell assembly as shown in FIG. 9 at 901. The discontinuously-folded embodiment may also be particularly advantageous as a result of the increased surface area on the horizontal top and bottom surfaces that contact the next contiguous layer in the fuel cell; however, it may be more expensive to manufacture than the other embodiments.

One method of manufacturing the polarized gas separator of the present invention involves shrinking a thermal setting epoxy around the porous metal substrate so that a first portion of the porous conductive substrate extends upward from the top surface of the epoxy barrier layer and a second portion of the porous conductive substrate extends from the bottom surface of the epoxy barrier layer. Essentially the method involves providing a porous conductive substrate, providing a mold, placing the porous conductive substrate in the mold, adding a thermal setting epoxy to the mold containing the porous conductive substrate, adding a hardener to the thermal setting epoxy in the mold to cause the epoxy to harden and shrink to form the barrier that bisects the porous conductive substrate to form a polarized gas separator, and then removing the resultant polarized gas separator from the mold. Enhancements to this method are contemplated within the present invention.

Figure 1:
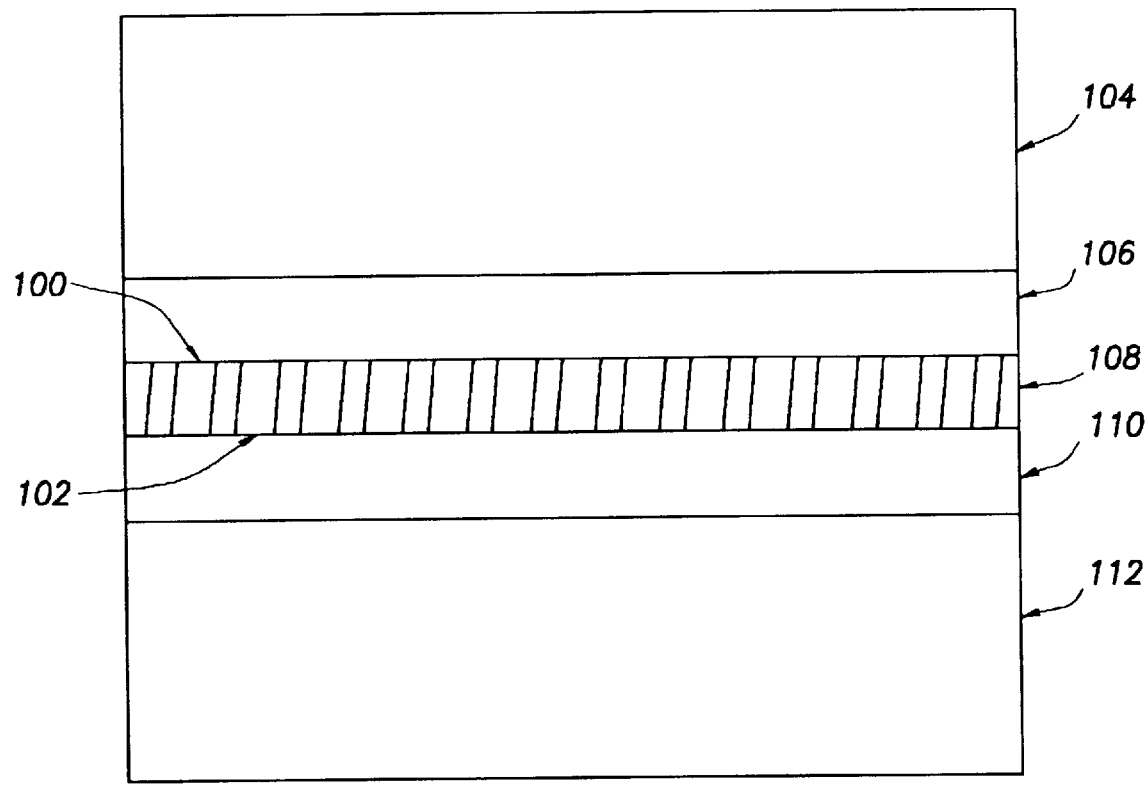
FIG. 1 is a schematic of a typical PEM fuel cell assembly.
Figure 2:
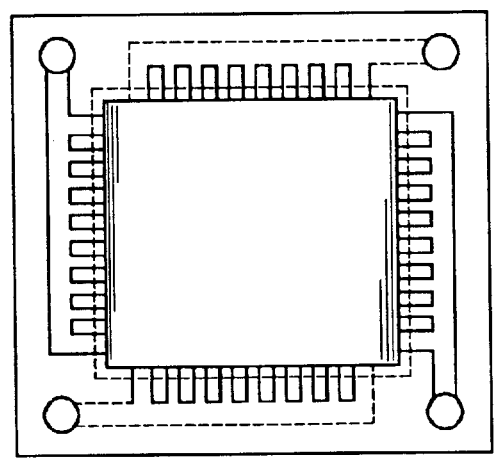
FIG. 2 is an illustration of a conventional frame for housing and supplying reactants to a fuel cell assembly.
Figure 5:
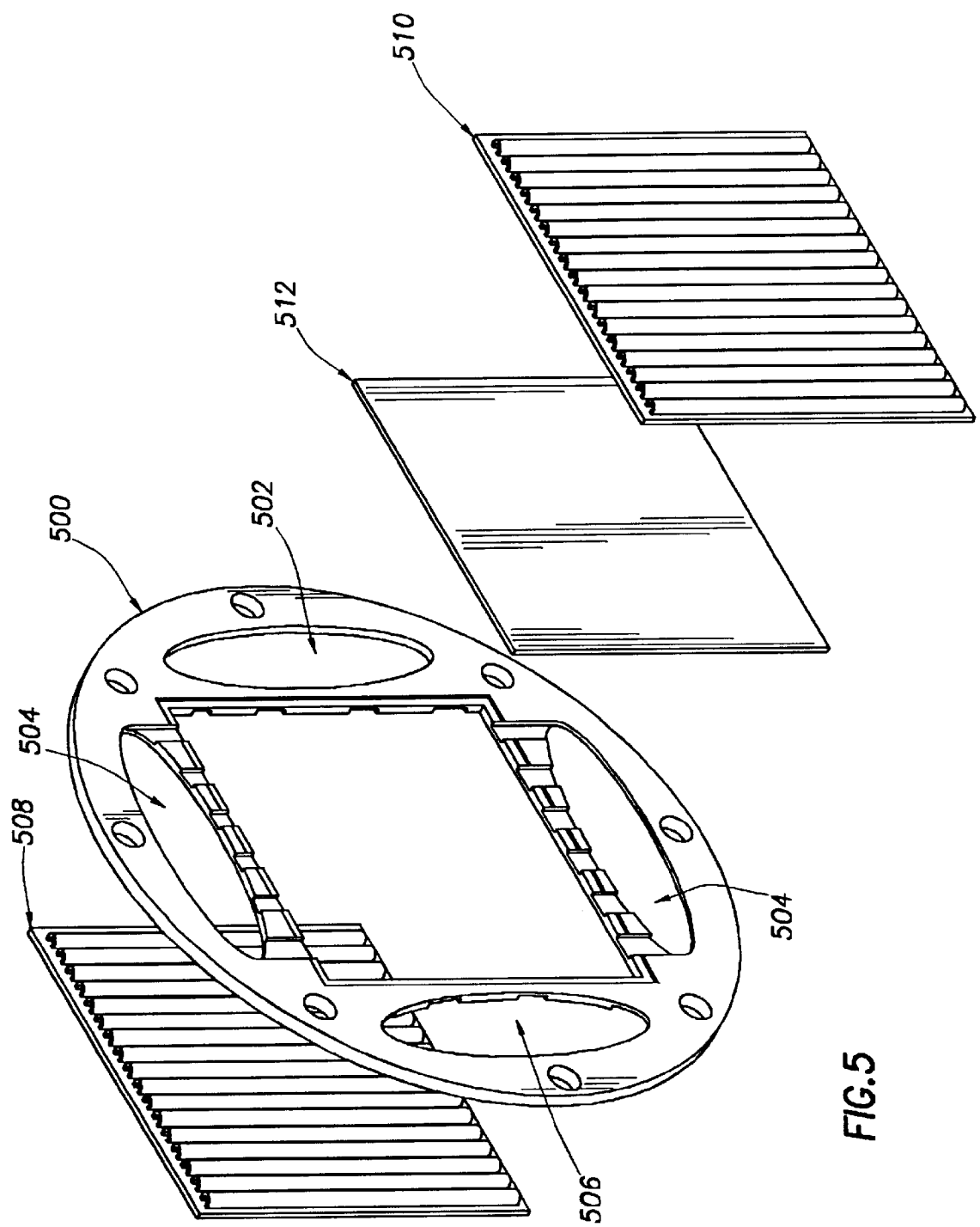
FIG. 5 is an exploded view of an embodiment of a fuel cell assembly of the present invention.

Although the polarized gas separators of the present invention may be used in conjunction with conventional distribution frames like those illustrated in FIG. 2, they are preferably and effectively used in conjunction with the fuel cell stack assemblies and distribution frames disclosed in Pat. No. 6,531,238. As shown in FIG. 5, the polarized gas separator of the present invention provides an enhancement to the fuel cell stack assemblies described in Pat. No. 6,531,238 the disclosure of which is incorporated herein by reference. Specifically, as shown in FIG. 5, the polarized gas separator of the present invention can be used at 508 and 510 in conjunction with the distribution frame to help facilitate transportation of the fuel and the oxidant to the fuel cell necessary for the electrochemical exchange. Specifically, FIG. 5 depicts the components of a fuel cell assembly of one embodiment of the present invention, namely, distribution frame 500, primary polarized gas separator 508, MEA 512, and secondary polarized gas separator 510. Primary polarized gas separator 508 consists of primary anode flow field formed from the lateral spansion of the barrier layer and the secondary cathode flow field also formed from the spansion of the barrier layer. MEA 512 is composed of an electrolyte and two catalytic active layers, one for the anode and one for the cathode. Any known MEAs are suitable in the present invention. When assembled, the procession of contiguous layers in the fuel cell assembly is: primary anode gas flow field (from polarized gas separator 508), barrier layer (from polarized gas separator 508), primary cathode flow field (from polarized gas separator 508), MEA 512, secondary anode flow field (from polarized gas separator 510), barrier layer (from polarized gas separator 510), and secondary cathode flow field (from polarized gas separator 510). Fuel inlets 504 and air inlet 502 on the distribution frame provide the reactants to the respective flow fields. Specifically, fuel inlet 502 provides fuel to the secondary anode flow field (as part of polarized gas separator 510). Fuel supply channels stretch from the interior sides or surfaces of the fuel inlets to supply the fuel to the flow fields. Air is fed to the cathode flow fields through air supply channels that are integral to the air inlet of the distribution frame. Two or more of these individual fuel cell assemblies can be combined to form a node. Two or more nodes can be combined to form a fuel cell stack assembly. Typically, these individual fuel cells will be interposed between end plates, which are preferably circular members, to form stacks or nodes. Stacks can be placed in series to increase voltage to a desired level, or such stacks can be arranged in parallel to increase amperes. In one embodiment of the present invention, one end plate is used for every six fuel cell assemblies to provide desirable and enhanced torsional properties to the stack assembly.

To enhance the liquid management within the fuel cell stack assembly, optionally a coalescer on the anode side and/or a coalescer on the cathode side may be used between the respective anode and cathode catalytic active layers of the MEA and the respective anode and cathode flow fields of the polarized gas separators. An anode side coalescer aids in the removal of the liquid-phase water, a by-product of humidification, in the anode flow field from the face of the anode catalytic active layer of the MEA and its ultimate removal from the fuel cell. Removing this water increases the diffusion rate within the anode flow field of the reactant to the catalytic active layer. A cathode side coalescer aids in the management of the free water in the cathode flow field formed as a by-product of the electrochemical exchange. When used in conjunction with one of the polarized gas separators described herein, at each coalescer, the water vapor or fine mist coalesces and is quickly converted to larger droplets that are removed from the flow fields by the coalescer and microchannel combination (the microchannels being formed by the configuration of the porous conductive substrate as described above and depicted in FIGS. 4, 7, and 9). Suitable materials for either coalescer include but are not limited to fibrous materials, that can be either woven or nonwoven. Suitable woven materials include cotton muslin or linen. Glass or KEVLAR™, a material produced from poly-paraphenylene terephthalamide, may also be used in woven form. Nonwoven materials are also suitable if they have sufficient coalescing properties. Their coalescing properties may be enhanced by treating the surface of the nonwoven with a known stamping or -punching technique. The construction materials for a woven or a nonwoven anode side coalescer should be hydrophilic; the construction materials for a woven or a nonwoven cathode side coalescer should be more hydrophobic than those used for an anode side coalescer.

Although the present disclosure has been described in detail, it should be understood that various changes, substitutions, and alterations can be made hereto without departing from the spirit and the scope of the invention as defined by the appended claims.

What is claimed is:

1. A polarized gas separator comprising:

a porous conductive substrate, and a barrier layer, the barrier layer having a first side and a second side, and laterally extending through the porous conductive substrate, and with the porous conductive substrate extending through the barrier layer, such that a first portion of the porous conductive substrate extends from the first side of the barrier layer and a second portion of the porous conductive substrate extends from the second side of the barrier layer.

2. The polarized gas separator of claim 1 wherein the porous conductive substrate is a metal wool, a wire mesh, or a three-dimensional open-cell foamed structure.

3. The polarized gas separator of claim 2 wherein the metal wool, wire mesh, or three-dimensional open-cell foamed structure is made from nickel, tin oxide, hastelloy, inconel, a conductive thermoplastic, an alloy of nickel, copper, alloys of copper, gold, alloys of gold, or stainless steel.

4. A polarized gas separator comprising:
a porous conductive substrate, and
a barrier layer, the barrier layer having a first side and a second side, and laterally extending through the porous conductive substrate such that a first portion of the porous conductive substrate extends from the first side of the barrier layer and a second portion of the porous conductive substrate extends from the second side of the barrier layer;
wherein the porous conductive substrate is plated with gold.

5. A polarized gas separator comprising:
a porous conductive substrate, and
a barrier layer, the barrier layer having a first side and a second side, and laterally extending through the porous conductive substrate such that a first portion of the porous conductive substrate extends from the first side of the barrier layer and a second portion of the porous conductive substrate extends from the second side of the barrier layer;
wherein the porous conductive substrate is a three-dimensional open-cell foamed structure having corrugations, the corrugations having a pitch and a run.

6. The polarized gas separator of claim 5 wherein the open-cell foamed structure having corrugations is formed from nickel or alloys of nickel.

7. The polarized gas separator of claim 1 wherein the barrier layer is a monolithic layer.

8. A polarized gas separator comprising:
a porous conductive substrate, and
a barrier layer, the barrier layer having a first side and a second side, and laterally extending through the porous conductive substrate such that a first portion of the porous conductive substrate extends from the first side of the barrier layer and a second portion of the porous conductive substrate extends from the second side of the barrier layer;
wherein the barrier layer consists essentially of epoxy.

9. The polarized gas separator of claim 1 wherein the porous conductive substrate comprises a thermoplastic material.

10. A polarized gas separator comprising:
a porous conductive substrate, the porous conductive substrate being a continuously-folded porous conductive substrate, and
a barrier layer, the barrier layer having a first side and a second side and laterally extending through the porous conductive substrate such that a first portion of the porous conductive substrate extends from the first side of the barrier layer and a second portion of the porous conductive substrate extends from the second side of the barrier layer.

11. The polarized gas separator of claim 10 wherein the continuously-folded porous conductive substrate is a continuously-folded metal wool, a wire mesh, or a three-dimensional open-cell foamed structure.

12. A PEM fuel cell stack assembly comprising:
(a) at least two polarized gas separators, each polarized gas separator having an anode side and a cathode side, and comprising:
(i) a porous conductive substrate; and
(ii) a barrier layer, the barrier layer having a first side and a second side, and laterally extending through the porous conductive substrate such that a first portion of the porous conductive substrate extends from the first side of the barrier layer and a second portion of the porous metal substrate extends from the second side of the barrier layer;
(b) at least one anode side coalescer, the anode side coalescer juxtaposed to the anode side of one of the polarized gas separators;
(c) at least one cathode side coalescer, the cathode side coalescer juxtaposed to the cathode side of another polarized gas separator; and
(d) at least one MEA, the MEA having an anode side that is juxtaposed to the anode side coalescer and a cathode side that is juxtaposed to the cathode side coalescer.

13. A fuel cell stack assembly according to claim 12 wherein the porous conductive substrate of one of the polarized gas separators is a corrugated porous conductive substrate, a continuously-folded, or a discontinuously-folded porous conductive substrate.

14. A fuel cell stack assembly according to claim 12 wherein the porous conductive substrate of one of the polarized gas separators is a metal wool, a wire mesh, or a three-dimensional open-cell foamed structure.

15. A fuel cell stack assembly according to claim 12 wherein the porous conductive substrate of one of the polarized gas separators is made from a hastelloy, inconel, nickel, an alloy of nickel, copper, an alloy of copper, gold, an alloy of gold, tin oxide, a conductive thermoplastic, a metal composite, a plastic composite, or a stainless steel.

16. A fuel cell stack assembly according to claim 12 wherein the barrier layer of one of the polarized gas separators consists essentially of epoxy.

17. A fuel cell stack assembly according to claim 12 wherein the porous conductive substrate is plated with gold.

18. A fuel cell stack assembly according to claim 12 wherein the anode side coalescer is a mesh of hydrophilic fibrous material.

19. A fuel cell stack assembly according to claim 12 wherein the cathode side coalescer is a mesh of fibrous material that is less hydrophilic than the mesh of hydrophilic material used to form the anode side coalescer.

20. A PEM fuel cell stack assembly comprising:
(a) at least two polarized gas separators, each polarized gas separator having an anode side and a cathode side, and comprising:
(i) a porous conductive substrate; and
(ii) a barrier layer, the barrier layer having a first side and a second side, and laterally extending through the porous conductive substrate such that a first portion of the porous conductive substrate extends from the first side of the barrier layer and a second portion of the porous metal substrate extends from the second side of the barrier layer;
(b) a distribution frame having:
(i) an anode side, a cathode side, and a central cavity suitable for housing an MEA;

(ii) at least two fuel inlet apertures, the fuel inlet apertures extending completely through the distribution frame and each fuel inlet aperture being located 180° from the other, and each fuel inlet aperture having an interior side;

(iii) an air inlet aperture, the air inlet aperture extending completely through the distribution frame and the air inlet aperture being located 90° from each fuel inlet aperture and 180° from an air and water outlet aperture, the air and water outlet aperture extending completely through the distribution frame, the air inlet aperture and the air and water outlet aperture further having interior sides;

(iv) a plurality of fuel supply channels, the fuel supply channels located on the anode side of the distribution frame and extending from the interior side of each fuel inlet aperture to the central cavity and being integral to each fuel inlet aperture;

(v) a plurality of air supply channels, the air supply channels located on the cathode side of the distribution frame and extending from the interior side of the air inlet aperture to the central cavity and being integral to the air inlet aperture; and (vi) a plurality of air and water outlet channels, the air and water outlet channels located on the cathode side of the distribution frame, the air and water outlet channels extending from the interior side of the air and water outlet aperture to the central cavity, and being integral to the air and water outlet aperture; and (c) an MEA, the MEA having an anode catalytic active layer and a cathode catalytic active layer, the anode catalytic active layer being juxtaposed to the anode side of one of the polarized gas separators and the cathode catalytic active layer being juxtaposed to the cathode side of another polarized gas separator.

21. A fuel cell stack assembly according to claim 20 further comprising an end plate.

22. A fuel cell stack assembly according to claim 20 wherein the porous conductive substrate of one of the polarized gas separators is corrugated.

23. A fuel cell stack assembly according to claim 20 wherein the porous conductive substrate of one of the polarized gas separators is a continuously-folded porous conductive substrate.

24. A fuel stack assembly according to claim 20 wherein the porous conductive substrate is a discontinuously-folded porous conductive substrate.

25. A fuel cell stack assembly according to claim 20 further comprising an anode side coalescer.

26. A fuel cell stack assembly according to claim 20 further comprising a cathode side coalescer.

27. A PEM fuel cell stack assembly comprising:
(a) at least two polarized gas separators, each polarized gas separator having an anode side and a cathode side, and comprising:
(i) a porous conductive substrate; and
(ii) a barrier layer, the barrier layer having a first side and a second side, and laterally extending through the porous conductive substrate such that a first portion of the porous conductive substrate extends from the first side of the barrier layer and a second portion of the porous metal substrate extends from the second side of the barrier layer;
(b) a coalescer; and
(c) at least one MEA, the MEA having an anode side that is juxtaposed the anode side coalescer or a cathode side that is juxtaposed to the cathode side coalescer.

28. A PEM fuel cell stack assembly according to claim 27 wherein the porous conductive substrate of one of the polarized gas separators is a corrugated, a continuously-folded, or a discontinuously-folded porous conductive substrate.

29. A PEM fuel cell stack assembly according to claim 27 wherein the porous conductive substrate of one of the polarized gas separators is a metal wool, wire mesh, or a three-dimensional open-cell foamed structure.

30. A fuel cell stack assembly according to claim 27 wherein the porous conductive substrate of one of the polarized gas separators is made from a hastelloy, inconel, nickel, an alloy of nickel, copper, an alloy of copper, gold, an alloy of gold, tin oxide, a conductive thermoplastic, a metal composite, a plastic composite, or a stainless steel.

31. A fuel cell stack assembly according to claim 27 wherein the barrier layer of one of the polarized gas separators consists essentially of epoxy.

32. A fuel cell stack assembly according to claim 27 wherein the porous conductive substrate is plated with gold.

33. A fuel cell stack assembly according to claim 27 wherein the coalescer is an anode side coalescer, the anode side coalescer being juxtaposed to the anode side of one of the polarized gas separators.

34. A fuel cell stack assembly according to claim 33 wherein the anode side coalescer is a mesh of hydrophilic fibrous material.

35. A fuel cell stack assembly according to claim 27 wherein the coalescer is a cathode side coalescer, the cathode side coalescer being juxtaposed to the cathode side of one of the polarized gas separators.

36. A fuel cell stack assembly according to claim 35 wherein the cathode side coalescer is a mesh of fibrous material.

* * * * *